United States Patent
Herman et al.

(10) Patent No.: US 6,263,264 B1
(45) Date of Patent: Jul. 17, 2001

(54) PSEUDO GYRO WITH UNMODELED DISTURBANCE TORQUE ESTIMATION

(75) Inventors: Louis K. Herman, Rancho Palos Verdes; Craig M. Heatwole, Redondo Beach; Girard M. Manke, Huntington Beach; Brian T. Hamada, Torrance, all of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/590,569

(22) Filed: Jun. 8, 2000

(51) Int. Cl.$^7$ .............................. G01B 11/26; G64G 1/32
(52) U.S. Cl. ...................... 701/13; 356/139.01; 244/166; 244/171; 73/178 R; 702/151
(58) Field of Search ................................ 701/13, 1, 4, 7; 356/137, 139.01; 244/165, 166, 171; 73/178 R; 702/150, 151; 250/559.37

(56) References Cited

U.S. PATENT DOCUMENTS

| | | | |
|---|---|---|---|
| 3,681,583 | * | 8/1972 | Kubo et al. ............................ 701/30 |
| 5,205,518 | * | 4/1993 | Stetson, Jr. ............................ 244/165 |
| 5,259,577 | * | 11/1993 | Achkar et al. ........................ 244/164 |
| 5,308,024 | * | 5/1994 | Stetson, Jr. ............................ 244/165 |

* cited by examiner

Primary Examiner—William A. Cuchlinski, Jr.
Assistant Examiner—Arthur D. Donnelly
(74) Attorney, Agent, or Firm—Derrick Michael Reid

(57) ABSTRACT

A pseudo gyro emulates mechanical gyros by software processes by processing space system appendage measurement data and reaction wheel tachometer data within reference and control systems of a satellite using principals of conservation of momentum to compute the vehicular bus angular velocity rate data by accounting for external torque, the momentum transfer between the satellite, the bus, and the appendages for providing accurate relative vehicular position and angular velocity rate data as an integral part of attitude reference and control systems now having higher reliability, longer life times, lower power consumption, and more accurate vehicular angular velocity rate data generated within high bandwidth operations. A specific improvement is the use of a bias torque estimator for accounting for uncertainties in external torque estimations for accurate total system momentum computations.

3 Claims, 4 Drawing Sheets

PSEUDO GYRO ATTITUDE REFERENCE SYSTEM

PSEUDO GYRO ATTITUDE REFERENCE SYSTEM

PSEUDO GYRO

KALMAN FILTER GAINS AND TIME CONSTANTS

| Attitude Determination | Gain Angle/Rate Random Walk | Attitude Time Constraint min/max (sec) | Bias Time Constraint min/max (hrs) |
|---|---|---|---|
| 2 TRACKERS, 2 STARS/TRACKER | | | |
| High Gain<br>Low Gain | 0.008/0.1<br>0.01/0.005 | 8.0/8.8<br>6.9/13.8 | .0024/.0033<br>.033/.033 |
| 1 TRACKER, 2 STARS/TRACKER | | | |
| High Gain<br>Low Gain | 0.008/0.1<br>0.01/0.005 | 9.9.9.9<br>9.77/119.6 | .0027/.012<br>.033/.045 |

FIG. 3

PSEUDO GYRO ERROR SOURCES

| Error Sources | | Calibrated Values |
|---|---|---|
| System Inertia Diadic, | $J_o$ | 2.50% |
| Communication Antenna to Bus Coupling Inertia, | $J_c$ | 1% |
| Reaction Wheel Alignment | RWA | 0.5 deg |
| Elctro-Magnetic Torquer | EMT | 6% scale factor |
| Magnetic Field Model, | EFM | 0.02G |

FIG. 4

PERFORMANCE TABLE

| Case | Roll (arc-sec) | | Pitch (arc-sec) | | Yaw (arc-sec) | |
|---|---|---|---|---|---|---|
| Error Sources | + | - | + | - | + | - |
| Perfect case | 5.0 | 3.0 | 7.0 | 2.0 | 4.5 | 4.0 |
| Jo:+2.5% | 6.8 | 4.0 | 12.8 | 2.4 | 3.0 | 11.2 |
| Jo:-2.5% | 5.5 | 6.0 | 3.7 | 5.5 | 2.5 | 13.5 |
| Jc_cga_b:+1% | 4.3 | 9.0 | 3.8 | 3.0 | 2.5 | 12.5 |
| Jc_cga_b:-1% | 15.3 | 5.5 | 11.8 | 3.0 | 3.0 | 11.5 |
| RWA align:+1/2 deg | 10.5 | 4.5 | 3.5 | 3.0 | 2.3 | 17.5 |
| RWA align:-1/2 deg | 4.0 | 5.6 | 14.2 | 5.0 | 3.0 | 6.8 |
| EMT:+6%,+2.25deg | 3.8 | 2.4 | 28.8 | 1.0 | 1.0 | 40.4 |
| EMT:-6%,-2.25deg | 12.0 | 3.4 | 2.5 | 21.0 | 14.5 | 1.8 |
| EFM:+0.02G | 5.0 | 16.0 | 21.5 | 8.0 | 3.0 | 7.0 |
| EFM:-0.02G | 7.0 | 10.0 | 23.8 | 7.5 | 4.0 | 3.8 |
| Worst Case | 32.0 | | 48.0 | | 50.4 | |

FIG. 5

PSEUDO GYRO WITH UNMODELED DISTURBANCE TORQUE ESTIMATION

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of gyro referenced satellite systems. More particularly, the present invention relates to systems and methods for emulating gyros for improved reliability and lifetime of flight systems, as particularly described in issued U.S. Pat. No. 6,020,956, entitled Pseudo Gyro, issued Feb. 1, 2000.

BACKGROUND OF THE INVENTION

Many satellite attitude reference and control systems require accurate, high bandwidth data indicating the angular velocity, that is vehicular rate of rotation of a main module o:r body of a satellite, commonly called the bus. The bus is the main portion of the satellite to which articulated appendages such as solar arrays, antenna and payloads are attached. The rotational angular velocity of the bus will change if the satellite carries gimballed appendages that react against the bus when the appendages are repositioned, typically during operational use. These changes are sensed by angular velocity measurement devices, commonly called gyroscopes, that are often used to measure the bus rotational angular velocity to provide rate data as required by reference and control systems on these satellites. The total momentum of a satellite will not change unless it is acted upon by an external torque under the principal of conservation of momentum. The total momentum of the satellite is the sum of the momentum in the bus and the appendages and momentum storage devices such as reaction wheels. In addition to attached appendages, a modern satellite system includes momentum storage devices such as a set of three reaction wheels providing reaction wheel tachometer data to an attitude control system for controlling the orientation and angular velocity rate of the satellite. The reaction wheels provide control torques to the vehicle bus while the attitude control system stores momentum in the reaction wheels from the external torques applied to the bus while generating reaction wheel tachometer data. The appendages are positioned by stepper motors. The stepper motors are considered control actuators that produce a controlled positioning rate to the appendage relative to the bus. A control input to the stepper motor will produce a given relative angular velocity between the appendage and the bus. The set of reaction wheels is used to control the bus attitude in all three rotational degrees of freedom. The reaction wheels provide control torques to the vehicle bus and store momentum from external torques applied to the bus by the external environment:. The external torque is derived from natural disturbances or from on-board thrusters. The momentum of the bus will vary as the appendages react against the bus when the appendages are reoriented.

The gyro is used to provide vehicular bus rotational rates., that is, the angular velocity data used for vehicular attitude reference and attitude control. In order to accomplish controlled attitude orientation and controlled angular velocity of the satellite, the control system requires accurate attitude data from the reference system and accurate angular velocity rate data from the gyro. The gyro operation is subject to errors and biases that are corrected by a low frequency filter such as a Kalman filter in the attitude reference system. The low frequency filter is any filter that receives measurement data and produces update data with a low frequency bandwidth within a high bandwidth of the system operation. Hence, the gyro is an integral and essential part of an attitude reference system and is necessary for the proper functioning of the attitude control system. Modern applications require accurate, high bandwidth gyroscopes with long lifetimes, high reliability and low power usage.

Appendages typically have encoders that measure appendage position relative to the bus and are positioned by stepper motors. The stepper motors are considered control actuators that produce a controlled rate to the appendage relative to the bus, An appendage control system is used to control a set of appendages. The appendage control system uses appendage measurements usually generated by encoders or resolvers on the shaft of the appendages that are typically solar arrays and antenna and payload type appendages. The appendage measurements usually include angular position data and sometimes the angular velocity data. These measurements are included for all appendages having significant momentum contributions to the system momentum. There are multiple appendages that contribute significantly to the system momentum, that is, there are multiple appendage measurements that can be used to significantly indicate the system momentum. For example, a typical satellite may use three appendages, such as a communication antenna assembly and two solar panels. Other appendages, including payload, optical, RF and IR sensors, can be used by the satellite. A communications antenna assembly, has two degrees of freedom. A stepper motor connected to a harmonic drive gear assembly actuates each degree of freedom. The input to the stepper motors is an angular rate command in terms of motor steps per second. Because each stepper motor accurately produces the commanded rate, the commanded rate is taken to be the true angular rate o:E the stepper motor. The angular rate of the appendage is the commanded rate of the stepper motor times the gear reduction ratio of the harmonic drive. This angular rate for both degrees of freedom is commanded by the appendage control system. Optical encoders measure the angular position of each of the degrees of freedom. The measurement data from the encoder is converted to radians and sent to the appendage control system as an angular position. The other two appendages are solar array panels each containing two degrees of freedom. As with the communications antenna assembly, stepper motors actuate both panels and encoders measure their angular position. Each panel has two stepper motors and two encoders. The four stepper motor commands and four encoder measurements are processed in the appendage control system.

A typical reference system of a spacecraft uses star trackers and gyro operations to accurately determine both current vehicular attitude and current angular velocity. The typical attitude reference system receives star catalog ground update data into a star tracking processor for providing a Kalman filter with predicted star orientation while a star tracker provides the actual star orientation. The difference between the predicted and actual star orientation is the residual error input that drives the Kalman filter. The star tracker is a sensor that measures the angular orientation of visual stars within an optical field of view of the sensor and provides the star tracking processor with actual star orientation data and provides the Kalman filter with measured star vectors indicating the orientation of the star in the sensor field of view. The star tracker searches for stars in the sensor field of view and compares the located star to the identified stars from the star catalog. The Kalman filter also receives vehicular rate data from the gyro and receives vehicular attitude data from an attitude propagator. The rate bias update data and attitude update data generated by the Kalman filter are communicated to the gyro and an attitude propagator, respectively. The propagated attitude is the onboard estimate of the vehicular orientation in the earth centered inertial coordinates frame.

Some reference systems may use multiple star trackers with each star tracker providing accurate positional information of various stars being tracked. Specifically, each star tracker produces horizontal and vertical outputs forming a unit vector that points in the direction of a tracked star. These horizontal and vertical outputs are provided at an update rate of the star tracker. In a typical case, the update rate of the star trackers is about 1.5 hertz. The star tracking processor uses the star tracker outputs to compute the error between the measured star vectors and the predicted star vectors. This computed measurement error is then used by the Kalman filter to generate attitude updates for updating the vehicular attitude and rate bias updates for the gyro.

The first step of a star tracking processor is star identification. In order to produce a measurement error a tracked star must be identified by the star tracking processor. A star catalog is uploaded in a spacecraft computer for access Ivy the star tracking processor. The star catalog contains the positional information and brightness measurements for hundreds of stars. The positional information is stored in earth centered inertial coordinates. The brightness information is a relative measurement of how bright the star should appear to the star tracker. Because of the proper motion of stars and the precession of the earth centered inertial coordinate frame, the star catalog is updated periodically from a ground location.

In order to identify a star, the location of a tracked star is transformed to earth centered inertial coordinates. This is done by forming a measurement vector in a star tracker coordinate frame from the horizontal and vertical star tracker outputs. the measurement vector is rotated into the earth centered inertial frame using a transformation between the star tracker and earth centered inertial coordinates that includes the propagated vehicular attitude. Once the location of a star in earth centered inertial coordinates has been calculated, coordinates are compared to the coordinates of the identified star in the star catalog. When the calculated coordinates match the coordinates of the identified star in the catalog within a specified tolerance and the brightness matches that of the star in the catalog within a specified tolerance the star has been identified. When a star has been identified, then the star tracking processor can compute the star measurement error for the Kalman filter. When the propagated vehicular attitude is correct, the measured vector from the star tracker will be oriented in the same direction as the identified star from the star catalog. When there is an error in the propagated attitude data 24, the residual between the catalog orientation and the measured star orientation is used by the Kalman filter to update the propagated attitude.

The on-board Kalman filter estimates six state variables including three attitude orientation errors, and three angular velocity rate errors. The attitude errors are used to provide a vehicular attitude update, and the angular velocity rate errors are used to update the bias of the gyro. The gyro bias is the difference between the gyro output and the true rate of rotation of the gyro, and the gyro bias is needed to compensate for errors in the gyro vehicular rate output. After the Kalman filter processes the star measurement error data into an attitude update, and a gyro bias error update, the states of the Kalman filter, the Kalman gain, and covariance matrix are updated using the discrete Kalman filter equations as is well known in the art. An attitude propagator is used to calculate the vehicular attitude between star tracker updates. The vehicular angular velocity rates from the gyro are multiplied by time since the last attitude propagation to give a small current angular rotation of the satellite specified by a small attitude transformation matrix indicating a small angle of rotation. The previous vehicular attitude is updated by this small attitude transformation matrix of rotation of the satellite to give the propagated vehicular attitude.

The attitude control system also functions to control the momentum of the spacecraft. Effects by external torques are measured by the gyro and include torques due to a gravity gradient. Gravity gradient torques are caused by the earth gravity by acting to align the vehicular principal axes of inertia, with the gravity vector directed towards the center of the earth. Well-known gravity gradient torques are dependent on the vehicular attitude relative to the gravity vector extending from the earth. Torque rods conduct current for generating external torque by magnetically interacting with the magnetic field of the earth. The attitude control system generates torque rod current used to transfer unwanted momentum from the satellite into the earth magnetic field.

The appendage measurement data, reaction wheel tachometer data and external torque rod current data define changes in momentum of the bus. These appendage measurement data, reaction wheel tachometer data, and external torque rod current data are momentum data related to the momentum of the spacecraft and processed by the attitude control system. This momentum data is available for momentum computational purposes, but has not beens previously used in a reference system to compute momentum values of the spacecraft nor used to emulate a mechanical gyro. Gyros, have accordingly long been used successfully in satellite attitude reference systems to provide the vehicular angular velocity rates of the satellite for satellite attitude referencing and positioning control. However, gyros are expensive and inherently have limited life times with low reliability and dynamic error characteristics, leading to premature failure of satellite systems. These and other disadvantages are solved or reduced using the invention.

SUMMARY OF THE INVENTION

An object of the invention is to provide a pseudo gyro that can be used in place of a gyroscope to increase the lifetime and reliability while reducing power requirements of a satellite system.

Another object of the invention is to process momentum data for emulating a gyro.

Yet another object of the invention is to provide a reference system in a flight or space system using an emulated gyro receiving the momentum data.

An object of the invention is to provide an estimate of external torque and to provide an estimate of an error in the external torque for emulating a gyro.

The invention is directed to a pseudo gyro by software processes to emulate the functions of a hardware gyro. Significantly, the pseudo gyro uses the principle of conservation of momentum to compute the bus rate by accounting for the momentum from external torques and the transfer between a satellite bus and the appendages and momentum storage devices such as reaction wheels. Specifically, the external torques, the appendage measurements and reaction wheel tachometer data are now used by the pseudo gyro to calculate the bus angular velocity rate. Accurate relative position and rate information are typically available from the attitude and appendage controllers on-board the satellite to facilitate these computations.

The pseudo gyro is preferably used as an integral part of an attitude reference system of a space satellite, but can be applied to other flight and space systems by replacing the hardware gyros. This pseudo gyro operates as part of the control and reference systems now having higher reliability, longer life times, lower power consumption, more accurate angular velocity rates within high bandwidth operations. These and other advantages will become more apparent from the following detailed description of the preferred embodiment.

BRIEF DESCRIPTION OF THE DRAWINGS

FIG. 3 is a table of Kalman filter gains and time constants.

FIG. 4 is a table of pseudo gyro error sources.

FIG. 5 is a table of performance parameters.

DETAILED DESCRIPTION OF THE PREFERRED EMBODIMENT

Figure 1:
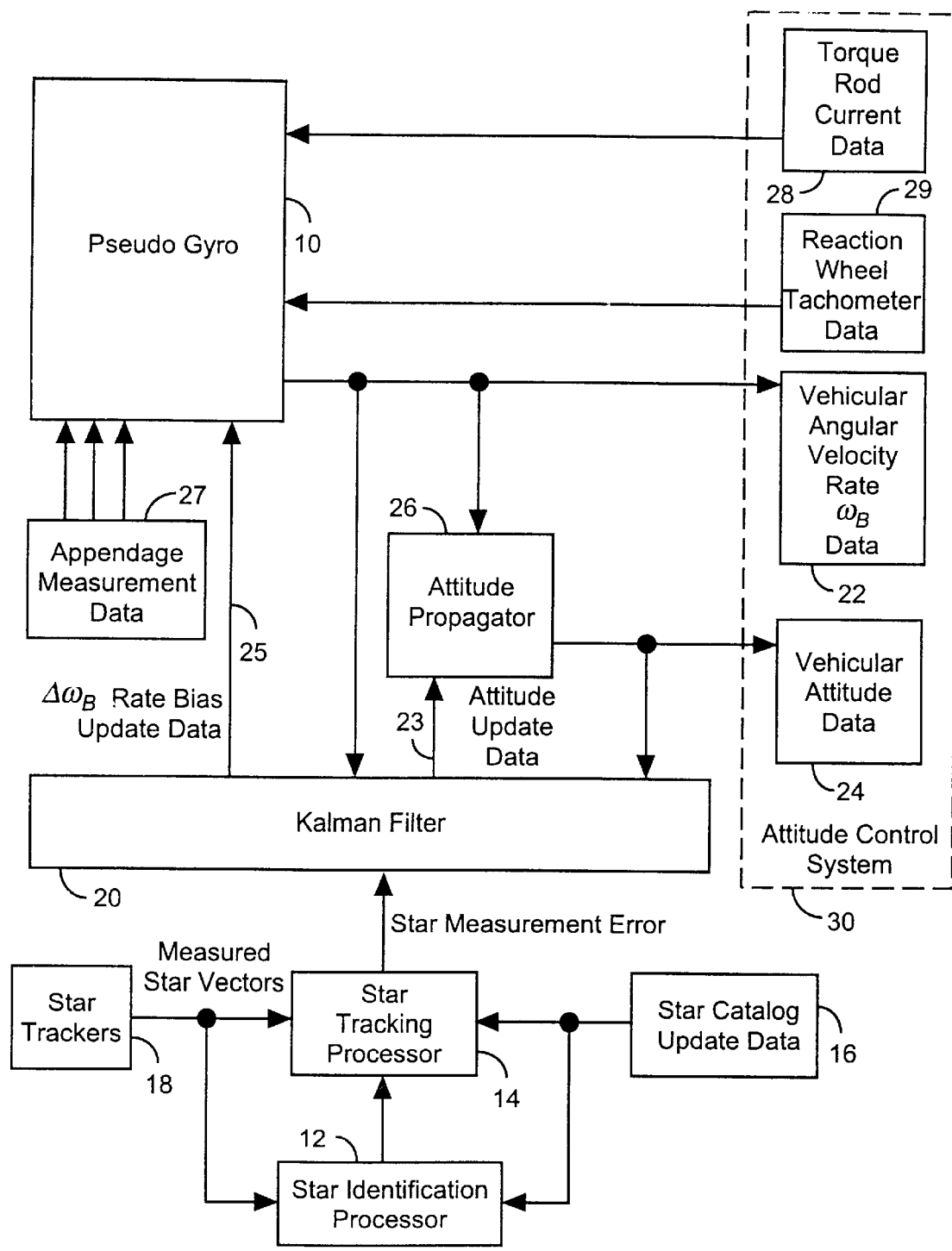
FIG. 1 is a block diagram of a pseudo gyro attitude reference system.

An embodiment of the invention is described with reference to the figures using reference designations as shown in the figures. Referring to FIG. 1, the pseudo gyro attitude reference system uses conventional system inputs, and processes with the improvement being the pseudo gyro 10 replacing conventional hardware gyros. The reference system includes a star identification processor 12 for selecting an identified star from the star catalog 16 communicated to a star tracking processor 14 from a ground station, not shown. The star identification processor 12 receives measured star vectors from the star trackers 18 and compares these measured star vectors to star catalog orientation data to identify stars tracked by the star trackers 18. The star tracking processor 14 receives star catalog ground update data 16 including the star orientation data, receives an identified star data from the star identification processor 12 and receives measured star vectors from star trackers 18, for providing star measurement error data to a Kalman filter 20. The Kalman filter 20 receives the measured star measurement error data from the star tracking processor 14, receives vehicular angular velocity rate data 22 from the pseudo gyro 10, and receives vehicular attitude data 24 from an attitude propagator 26 for providing bias update data 25 communicated to the pseudo gyro 10, and for providing attitude update data 23 to the attitude propagator 26. The pseudo gyro 10 also receives appendage measurement data 27 of attached appendages, not shown, from an appendage control system, not shown. The attached appendages, not shown, such as exemplar communication antenna assembly and two solar panels are used in the preferred form, but other appendages, such as attached payloads, could be used as well, all of the appendages have measurement devices such as encoders or resolvers for generating the appendage measurement data 27 as momentum data. The three appendages have encoders that measure appendage position relative to the bus. The pseudo gyro 10 also preferably receives reaction wheel tachometer data 29 communicated from an attitude control system 30. Attached appendages including operational encoders and resolvers, and reaction wheels, not shown, are all well known by those skilled in the art of satellite system designs. The reference system, including star trackers 18, star identification processors 14, star tracking processors 14, star catalog update data 16, Kalman filter 20, and attitude propagators 26 for supplying vehicular angular velocity rate data 22 and vehicular attitude data 24 to an attitude control system 30 are also well known by those skilled in the art of satellite system designs.

The pseudo gyro 10 provides an improvement in the construction, operation and accuracy of the attitude reference system. Significantly, the pseudo gyro 10 uses momentum data such as appendage measurement data 27, reaction wheel tachometer data 29 and torque rod current data 28 for generating vehicular angular velocity rate data 22 as a software emulation replacement of a conventional hardware gyro, not shown. The vehicular angular velocity rate data 22 is based on on-board computer calculations for emulation of the replaced hardware gyro. The pseudo gyro 10 provides inertial vehicular angular velocities rate data 22 as an inherent component of the spacecraft inertial reference system. The pseudo gyro 10 functions as a direct replacement to the inertial hardware gyro in the same position in the reference system but now preferably receiving appendage measurement data 27, reaction wheel tachometer data 29, and torque rod current data 28 for direct emulation of the hardware gyro. The pseudo gyro 10 functionally replaces or can optionally operate in tandem with the hardware gyro so that either the hardware gyro or a pseudo gyro 10 may be used to provide redundant inertial vehicular angular velocity rate data 22 for improved attitude control or extended lifetime.

Figure 2:
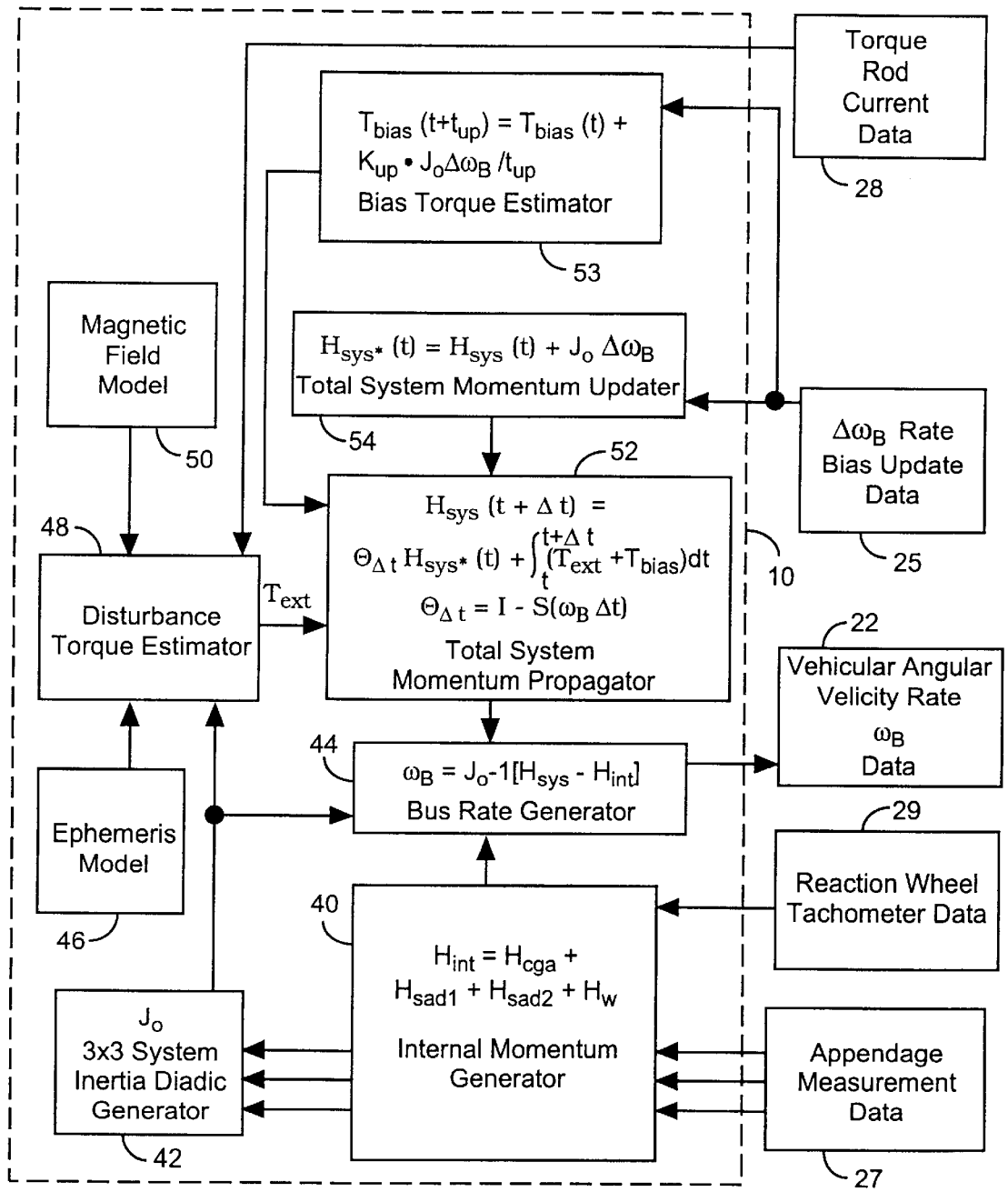
FIG. 2 is a block diagram of the pseudo gyro shown receiving appendage measurement data for computing angular velocity.

Referring to FIGS. 1 and 2, and more particularly to FIG. 2, the pseudo gyro 10 receives appendage measurement data 27 from an appendage control system, not shown, reaction wheel tachometer data 29 from the attitude control system 30, and bias update data 25 from the Kalman filter 20, and provides vehicular velocity rate data 22 to the attitude control system 30. In the exemplar form, the pseudo gyro 10 is applied to the exemplar multiple bodied spacecraft preferably comprising three appendages including the two solar array drives, a communication gimballed assembly, and a set of reaction wheels, all not shown. The appendage control system, also not shown, provides the appendage measurement data 27, comprising solar array appendage data sad1 and sad2 and communication gimballed assembly appendage measurement data cga while the attitude control system 30 provides reaction wheel tachometer data w 29 for generating the vehicular angular velocity rate data 22 communicated back to the attitude control system 30. Hence, the exemplar spacecraft has three attached appendages providing solar array data sad1 and sad2 and communication gimballed assembly data cga, has a set of reaction wheels for generating reaction wheel data w 29, and torque rods for generating torque rod current data 28.

The pseudo gyro 10 generates the vehicular angular velocity rate data 22 based on computer calculations on-board the spacecraft. The pseudo gyro 10 computes internal momentum data 40 Hcga, Hsad1, Hsad2 and Hw using appendage measurement data 27 and the reaction wheel tachometer data 29. An inertia diadic generator 42 computes system inertia diadic data Jo based on the appendage measurement data 27. The inertia diadic data Jo from the generator 42 and the internal momentum data Hcga, Hsad1, Hsad2 and Hw from the internal momentum generator 40 and total system momentum data Hsys are communicated to a bus rate generator 44 for generating the vehicular angular velocity rate data 22. The inertia diadic data Jo from the generator 42 is also communicated to a disturbance torque estimator 48 that receives magnetic field data from a magnetic field model 50, receives ephemeris data from an ephemeris model 46, and receives torque rod current data 28 from the attitude control system. The disturbance torque estimator applies the Jo inertia diadic data and torque rod current data to the magnetic field model and ephemeris model for generating external torque data Text. The disturbance torque estimator 48 computes and communicates the external torque data Text to a total system momentum propagator 52 receiving updated system momentum data Hsys* from a total system momentum updater 54 that in turn receives bias update data 25 from the Kalman filter 20. The total system momentum propagator 52 computes the total system momentum Hsys communicated to the bus rate generator for computing the vehicular angular velocity rate data 22.

A bias torque estimator 53 also receives the rate bias update data and computes an estimate of an error in the estimated external torque Text. Tbias is the estimate of the error in the estimated external disturbance torque Text. The term t is the running time and tup is the time interval between Kalman filter updates of filter 20. The Tbias estimator error is equal to the prior estimated error Tbias at time t plus an incremental update. The incremental update is equal to Kup*Jo*ΔωB divided by the time interval tup. The estimate of the external torque error Tbias is received by the total system momentum propagator 52 for updating the total system momentum Hsys as an update to the estimated external torque Text. Errors in the estimated torque result from uncertainties in the calculated amount of external disturbance torque Text. The uncertainties include unknown satellite dipoles, errors in the magnetic field model, and other general uncertainties in the external torque estimate Text, for example, uncertainties resulting from wind solar pressure, aerodynamic drag torques, electronic transmission reactions, and satellite fluid flows.

The bias torque estimator 53 provides a running average of the error in the Text. A non-zero mean of the rate bias update data 25 indicates that there is an error in the estimated external torque Text because the disturbance torque estimator is the only source of momentum added to the total system momentum and because the rate bias update data 25 will indicate over time an error in the system momentum. By computing an estimate in the error of the torque estimate, the pseudo gyro can account for imprecise external torque estimates for many possible error sources.

In the preferred form, the pseudo gyro 10 uses the magnetic field model 50 and the ephemeris model 46 for determining gravity external torques and magnetic external torques. In this embodiment the disturbance torque estimator 48 requires a model for determining external torques, such as the ephemeris model 46 or the magnetic model 50, or preferably both, but other models and measurements could be used, such as gravity gradient models, solar pressure models and aerodynamic drag models and magnetometer data. The models 46 and 50 may be mathematical models or a compilation of measurement data. Disturbance torque models are used by the external torque estimator 48 for generating the external torque Text by applying the inertia diadic Jo and related torque data, if any, such as torque rod current data 28 and the models 46 and 50. These external torques Text are calculated based on the magnetic field model 50 of the earth and the ephemeris model 46 describing the satellite orbit, including the position and linear velocity of the spacecraft, and based upon torque rod current data 28 and magnetic field model data 50. The disturbance torque estimator 48 receives torque rod current data 28, ephemeris model 46 and magnetic model 50 for computing the external torque Text.

Pseudo gyro emulation is based on the principle of conversation of momentum of the spacecraft as an integrated composite system. The operation of the pseudo gyro 10 is based on the principle that the total system momentum Hsys of the spacecraft is the sum of the momentum of all of the component parts. The momentum of the bus is not known, but can be calculated from the total system momentum and the momentum of the reaction wheels and attached appendages. Determining the partial momentum of the reaction wheels and attached appendages requires momentum data indicated by angles and commanded rates of appendage measurement data 27 and by reaction wheel tachometer data 29. The momentum of the bus is equal to the total system momentum Hsys minus the momentum data Hcga, Hsad1 and Hsad2 of the attached appendage and minus the momentum data Hw of the reaction wheels. The total system momentum Hsys can be calculated from the previous iteration of Hsys generated values, and from changes in the external torques Text over a predetermined iteration time period Δt. The total system has constant momentum in the inertial space coordinate frame unless changed by external torques Text. After each Kalman filter update, the total system momentum updater 54 computes the updated total system momentum Hsys* from previously computed values of the total system momentum Hsys, the inertia diadic data Jo and the bias update data 25 from the Kalman filter 20. The total system momentum Hsys is then computed by propagator 52 using the updated total system momentum Hsys* and by the external torques Text on the system.

The total system momentum Hsys 52 of the entire vehicle is a function of the external torque Text and a body-axis inertial momentum θHsys*. Hsys* is the updated total system momentum computed 54 from the previous total system momentum computation. The momentum propagator 52 and the momentum updater 54 are specified in vector-matrix form in a three dimensional space. Changes in the total system momentum Hsys are computed by adding the integration of the external torques Text to the body axis inertial momentum θHsys*. The attitude transformation matrix θ is equal to an identity matrix I minus a skew operator S specified as a function of the vehicular angular velocity rate ωB data 22 and Δt. Due to the motion of the vehicle body relative to inertial space, the total system momentum Hsys is updated every computation cycle at time t. The body axis inertial momentum θHsys* is the product of an incremental attitude transformation matrix θ and the previously computed updated total system momentum Hsys* 54. Propagating the updated total system momentum Hsys 52 is a propagation of the total system momentum at time t to time t+Δt. The total system momentum Hsys is revised and corrected 54 periodically to reflect rate corrections ΔωB using the inertia diadic data Jo from generator 42 and rate bias update data 25 from the Kalman filter 20. When Kalman filter updates are unavailable, Hsys*=Hsys 54. The updated total system momentum Hsys* from the updater 54 is communicated to the total system momentum propagator 52 that then computes the total system momentum Hsys at time t+Δt. The total system momentum Hsys is communicated to the bus rate generator 44 for computing an updated vehicular angular velocity rate 22. The vehicular angular velocity rate 22, that is, the bus rotational rate wB is equal to the inverse matrix of the inertia diadic data Jo multiplied by the matrix subtraction of the total system momentum Hsys minus the internal momentum Hint, as a momentum balance relationship. The internal momentum Hint is equal to the sum of the communication gimballed assembly momentum Hcga plus the first solar array device momentum Hsad1 plus the second solar array device momentum Hsad2 plus the reaction wheel momentum Hw and is computed by the internal momentum generator 40 from the reaction wheel tachometer data 29 and the appendage measurement data 27. This internal momentum Hint is used with the total system momentum Hsys for generating the bus angular velocity ωB. Hint is expressed in the bus coordinate frame as opposed to a local appendage coordinate frame.

The pseudo gyro 10 is dependent on the mass properties of the vehicle system including all the attached appendages as specified by the inertia diadic data Jo. The matrix Jo is the system inertia diadic and is calculated as a function of the appendage measurement data 27 expressed in angles. The matrix data Jo is the inertia tensor or inertia diadic of the system and is represented for computational purposes as a three by three matrix. The diadic data Jo contains data indicating the principal axes of inertia and includes the attached appendages and is used to determine the gravity gradient external torques Text on the vehicle. The momentum balance relationship of the bus rate generator 44 specifies the basic operation of the pseudo gyro 10 and is given as Hsys=JoE−1×[ωB−Hint] where JoE−1 in the inverse of Jo and Hint is given as the sum of all the momentum Hcga, Hsad1, Hsad2 and Hw of all the internal momentum sources such as the reaction wheels and the appendages.

The total system momentum Hsys is constant unless changed by external torques Text on the vehicle system. These external torques 48 are calculated based on a magnetic field model 50 of the earth and an ephemeris model 46 that provides linear position and velocity data of the vehicle. The disturbance external torques applied to the vehicle may be considered the most uncertain. However, the disturbances due to gravity gradient torques are well known. Because the earth magnetic field can be measured or modeled accurately on-board using the high order models 50 that are known to those skilled in the art. The magnetic field torques can be accurately computed as part of the external torques 48. External magnetically induced torques are caused by the torque rods in which current carrying coils produce external torques by magnetically interacting with the earth magnetic field. The external torques Text also includes torques due to gravity gradients. Gravity gradient torques are caused by gravity acting to align the principal axes of inertia with the gravity vector directed to the earth center. Gravity gradient torques are dependent on the vehicle attitude relative to the earth gravity vector. The external torques are then integrated to produce a measure of the change in system momentum Hsys. The relative appendage momenta Hcga, Hsad1 and Hsad2 are also well known through predetermined well-known mass properties of the appendages, through data from the appendage encoders, and from the stepper motors driving the appendages at predetermined known angular stepping rates.

The operator S is a skew-symmetric operator and has the form of a three by three matrix and is defined as S(V)=[0−vz vy; vz 0−vx; −vy vx 0], where V=[vx vy vz] is transposed. The process of transforming the total system momentum incrementally into the bus coordinate frame can also be described by the sum of the previous momentum in the bus frame plus the cross product of incremental rotation ωBΔt and total system momentum Hsys. The integral of the cross product is equivalent to a small angle of rotation of the system momentum. The appendage momentum Hcga is equal to Jcga×dcga/dt where Jcga is a three by three inertia matrix and dcga/dt is the time derivative rate of change of the communication gimballed assembly momentum Hcga. The inertia matrix Jcga has embedded in it a transformation to provide the relative communication gimballed assembly momentum Hcga in the bus coordinate frame. Similar relationships are used for the remaining components of the appendage momentum Hsad1, Hsad2 and Hw.

The solution of the momentum balance equation, Hsys= Jo×ωB+Hint for the bus vehicular angular velocities rate ωB requires the inverse of the system inertia diadic matrix Jo. Trhe inverse of the Jo matrix is trivial in the three by three matrix space and the inverse Jo matrix can be determined analytically and as such is not a significant computational burden to the spacecraft computer. The solution for the bus angular velocities is given as ωB=JoE−1×[Hsys−Hint] by the generator 44. The momentum balance equation of the bus rate generator 44 is not corrupted by the lack of knowledge of inter-body friction torques. The system inertia diadic matrix Jo and the inverse matrix of Jo are predetermined to be known accurately, but because the system mass is large and does not change rapidly, the Jo generator 52 computational rates are slowed to 0.1 hertz to reduce the computational load in the on-board processors.

The pseudo gyro 10 operates in combination with the Kalman filter 20 providing bias rate update corrections 25. Preferably, a six state Kalman filter 20 provides update corrections to both the attitude propagator 26 by generating attitude update data 23 and to the pseudo gyro 10 by generating bias rate update data 25. The rate bias ωB update data 25 is based on inertially fixed stars. The rate bias update data 25 is produced at a frequency of 1.5 hertz by the on-board Kalman filter 20. While the majority of the computations in the pseudo gyro 10 occur at twelve hertz, the correction to total system momentum Hsys will only occur when a Kalman filter bias rate update data 25 is generated. The computer update rate on computations 42, 44, 46, 48, 50 and 52 is preferably twelve hertz, whereas the update rate for the updater 54 is at 1.5 hertz, and the update rate for the inertia diadic Jo 42 is 0.1 hertz. The total system momentum updater 54 provides Hsys* to the total system momentum propagator 52 at a 1.5 hertz rate. The previous value of total system momentum Hsys at time t is used at the twelve hertz rate to propagate the total system momentum Hsys to the new time t+Δt except when the Kalman filter 20 provides bias rate data 25 and attitude update data 23 at the 1.5 hertz rate. The pseudo gyro computations are compatible with available computer processing speeds offering inherently fast operational computation bandwidths.

In some space missions, such as interplanetary space missions, the spacecraft may not be subjected to significant gravity gradients and external magnetic fields, and therefore, the spacecraft would not be subjected to significant external torques. Also, during suspension periods within a space mission, external torque computation processing may be suspended or intermittently not used. During these interplanetary space missions and suspension periods, the ephemeris model 46, the magnetic field model 50, the disturbance torque estimator 48 and the torque rod current data 28 would not be used as the external torque Text would be insignificant. Hence, in one form of the invention, the pseudo gyro 10 may only use the updater 54, propagator 52, bus rate generator 44 and the internal momentum generator 40. Minimally, the pseudo gyro 10 must include at least an internal momentum generator 40 receiving momentum data, such as, data 27 and 29, a diadic generator 42 for generating the inertia diadic Jo, and the momentum propagator 52 for computing the total system momentum when the orientation of the spacecraft changes causing a change in the skew symmetric matrix S(ωBΔt). Further still, during periods of low power consumption, such as when powering down the star trackers, the bias rate update data 25 may no longer be generated by the Kalman filter 20 such that the total system momentum updater 54 is not used, and the propagator 52 functions with a constant value of total system momentum Hsys in inertial space. During such periods of low power consumption, suspension or interplanetary operation, with no applied external torques, the pseudo gyro 10 would minimally include generators 40, 42, 44 and 52 for receiving some momentum data, such as data 27 and 29, and for generating the vehicular angular velocity rate data 22. Furthermore, the pseudo gyro 10 has wide application to any moving vehicular system having attitude control using angular velocity rate data.

Referring to all of the Figures and more particularly to FIGS. 3, 4 and 5, the Kalman filter 20 is specified by angle random walk gains and rate random walk gains and the Kalman filter output bias rate data and attitude update data 23 as characterized by respective convergent time constants. These time constants indicate the length of time required for the Kalman filter 20 to converge on bias rate update and attitude update solutions. Reference systems using pseudo gyros have been evaluated by computer simulation as indicated by exemplar low and high gains constituting a preferred range of Kalman filter operation. These Kalman filter gains and time constants are practical for spacecraft applications, but other gains and time constants may be well suited for other types of spacecraft, inertial guidance and control applications.

The Kalman filter gains and time constants are preferably optimized for error sources. The error sources include system inertia diadic error Jo, communication antenna to bus coupling inertia error Jc_cga_b, reaction wheel alignment error RWA, an electro-magnetic torque scale factor error EMT, and a magnetic field model error EMF. These error sources cause errors in the vehicular angular velocity rate output 22 of the pseudo gyro 10. The pseudo gyro 10 requires specified parameters to function properly and these parameters affect the accuracy of the pseudo gyro 10.

These parameters include the momentum of individual reaction wheels Hw acquired through the use of reaction wheel tachometer data 29, reaction wheel alignment data RWA initially acquired through ground measurements, the system inertia diadic data Jo also initially acquired through ground measurements for the Jo system diadic data generator 42, stepper motor command rates for the attached appendages and the appendage angles as appendage measurement data 27 as acquired by encoders of the attached appendages. These error sources and parameters are well known by the those skilled in the art. The vehicular attitude data 24 from the attitude propagator 26 includes Roll, Pitch and Yaw angles. The pseudo gyro 10 performance is sensitive to errors in the system inertia Jo and the amount of momentum stored in the reaction wheels, the inertia of the communication gimballed assembly appendage Jc_cga_b, the reaction wheel alignment RWA, the alignment of the electromagnetic torques EMT, and external magnetic fields applied to the magnetic field model EMF. The positive and negative errors in the Roll, Pitch, and Yaw axes of the exemplary pseudo gyro to each of the error sources is shown in FIG. 5. The momentum of the individual reaction wheels and the commanded rates to the stepper motor, and the appendage angles are assumed to be accurately known for computing the vehicular attitude data 25 in the performance table verifying the operation of the exemplar form.

The pseudo gyro 10 is used to-provide accurate vehicular angular velocity rate data 22 and accurate attitude data 24. Attitude data 24 is more accurate when the star trackers 18 are tracking stars. When either one of the star trackers 18 is not tracking a star, the bias update data 25 from the Kalman filter 20 is degraded when tracking one star or not computed when not tracking any star. When both trackers 18 have started tracking respective stars, the Kalman filter bias rate update data 25 is used to update the total system momentum Hsys to compensate for the errors from the error sources. When both trackers 18 are not tracking a star, the accuracy of attitude data 24 degrades. The extent of the attitude data degradation is revealed by the values in the performance table. The performance table reveals a sensitivity analysis that injects errors in turn and reports the corresponding vehicular attitude data 24 using a simulation model of the multiple bodied spacecraft vehicle used in the preferred form. This simulation model includes models of the encoders, the stepper motors, the reaction wheels and the tachometers. The spacecraft rotational coordinate axes are Pitch, Roll, and Yaw. The attitude reference errors tabulated in the performance table are relative to the true attitude of the vehicle in the simulation model. The tabulated error results of the performance table are specified in arc-seconds. The simulation is performed twelve times for each line item in the performance table for the respective error sources. The first line item is the perfect case when injecting no errors into the simulation. The last line item is the worst case that is generated from injecting the worst combinations of error sources. The performance table demonstrates that the pseudo gyro 10 can produce accurate vehicular attitude data 22 without the use of a hardware gyro.

The pseudo gyro 10 emulates hardware gyros by computer processing of momentum data using principles of conservation of momentum by accounting for the momentum transfers between the bus and the appendages and by accounting for applied external torques for providing accurate vehicular angular velocity rate data 22 as an integral part of the attitude reference system for also generating highly accurate vehicular attitude data 24 within high bandwidth operations, higher reliability, longer life times and lower power consumption. Those skilled in the art can make enhancements, improvements and modifications to the invention. However, those enhancements, improvements and modifications may nonetheless fall within the spirit and scope of the following claims.

What is claimed is:

1. A pseudo gyro for generating vehicular angular velocity rate data for a vehicular system providing momentum data and providing rate bias update data, the pseudo gyro comprises, an internal momentum generator for receiving momentum data and for generating total internal momentum, an inertia diadic generator for receiving the momentum data and for generating an inertia diadic, a total system momentum propagator for receiving the velocity rate data and for generating a total system momentum in body axes of the vehicular system, a bus rate generator for receiving the total system momentum, the inertia diadic, and the total internal momentum and for computing the vehicular angular velocity rate data, a system momentum updater for receiving rate bias update data and for computing updated system momentum, wherein the total system momentum propagator receives the updated system momentum and repetitively computes the total system momentum, and wherein the bus rate generator repetitively computes the vehicular angular velocity rate data, and a bias torque estimator for receiving the rate bias update data and for computing a bias torque bias error estimate of an error in the external torque estimates wherein the total system momentum propagator receives the external torque estimates and the torque bias error estimate for repetitively computing the total system momentum.

2. A pseudo gyro for generating vehicular angular velocity rate data for a vehicular system providing momentum data and providing rate bias update data, the pseudo gyro comprising, an internal momentum generator for receiving momentum data and for generating total internal momentum, an inertia diadic generator for receiving the momentum data and for generating an inertia diadic, a total system momentum propagator for receiving the velocity rate data and for generating a total system momentum in body axes of the vehicular system, a bus rate generator for receiving the total system momentum, the inertia diadic, and the total internal momentum and for computing the vehicular angular velocity rate data, a system momentum updater for receiving the rate bias update data and for computing updated system momentum, wherein the total system momentum propagator receives the updated system momentum and repetitively computes the total system momentum, and wherein the bus rate generator repetitively computes the vehicular angular velocity rate data, a magnetic field model for representing an earth magnetic field as a magnetic field external torque source, an ephemeris model for calculating earth gravity gradients; as a gravity gradient external torque source, and a disturbance torque estimator for receiving torque rod data indicating an interaction of the vehicular system with the earth magnetic fields, for receiving the inertia diadic and for generating external torque estimates by applying the torque rod data to the magnetic field model and applying the inertia diadic to the ephemeris model, and a bias torque estimator for receiving the rate bias update data and for computing a bias torque bias error estimate of an error in the external torque estimates wherein the total system momentum propagator receives the external torque estimates and the torque bias error estimate for repetitively computing the total system momentum.

3. A pseudo gyro for generating vehicular angular velocity rate data for an attitude reference of a vehicular system providing momentum data and providing rate bias update data, the pseudo gyro comprising, an internal momentum generator for receiving momentum data and for generating total internal momentum, an inertia diadic generator for receiving the momentum data and for generating an inertia diadic, a total system momentum propagator for receiving the velocity rate data and for generating a total system momentum in body axes of the vehicular system, a bus rate generator for receiving the total system momentum, the inertia diadic, and the total internal momentum and for computing the vehicular angular velocity rate data, a system momentum updater for receiving the rate bias update data and for computing updated system momentum, wherein the total system momentum propagator receives the updated system momentum and repetitively computes the total system momentum, and wherein the bus rate generator repetitively computes the vehicular angular velocity rate data, a magnetic field model for representing an earth magnetic field as a magnetic field external torque source, an ephemeris model for calculating earth gravity gradients as a gravity gradient external torque source, and a disturbance torque estimator for receiving torque rod data indicating an interaction of the vehicular system with the earth magnetic fields, for receiving the inertia diadic and for generating external torque estimates by applying the torque rod data to the magnetic field model and applying the inertia diadic to the ephemeris model, and a bias torque estimator for receiving the rate bias update data and or computing a bias torque bias error estimate of an error in the external torque estimates wherein the total system momentum propagator receives the external torque estimates and the torque bias error estimate for repetitively computing the total system momentum.

\* \* \* \* \*